(12) United States Patent
Tempel et al.

(10) Patent No.: US 11,739,858 B2
(45) Date of Patent: Aug. 29, 2023

(54) SANITARY VALVE WITH A DIAPHRAGM

(71) Applicant: Neoperl GmbH, Mullheim (DE)

(72) Inventors: Marc Tempel, Freiburg (DE); Yichao Bian, Mullheim-Hugelheim (DE)

(73) Assignee: NEOPERL GMBH, Mullheim (DE)

( * ) Notice: Subject to any disclaimer, the term of this patent is extended or adjusted under 35 U.S.C. 154(b) by 147 days.

(21) Appl. No.: 16/609,317

(22) PCT Filed: Feb. 20, 2018

(86) PCT No.: PCT/EP2018/054150
§ 371 (c)(1),
(2) Date: Oct. 29, 2019

(87) PCT Pub. No.: WO2018/215098
PCT Pub. Date: Nov. 29, 2018

(65) Prior Publication Data
US 2021/0301511 A1    Sep. 30, 2021

(30) Foreign Application Priority Data
May 26, 2017 (DE) .......................... 202017103194.2

(51) Int. Cl.
*F16K 31/385* (2006.01)
*E03D 3/06* (2006.01)
*F16K 31/524* (2006.01)
*F16K 31/56* (2006.01)

(52) U.S. Cl.
CPC ............ *F16K 31/3855* (2013.01); *E03D 3/06* (2013.01); *F16K 31/52491* (2013.01); *F16K 31/56* (2013.01)

(58) Field of Classification Search
CPC ........... F16K 31/3855; F16K 31/52491; F16K 31/56; E03D 3/06; Y10T 137/9464
(Continued)

(56) References Cited

U.S. PATENT DOCUMENTS 4,915,347 A * 4/1990 Iqbal ....................... E03C 1/057
251/38
5,911,240 A * 6/1999 Kolar .................... F16K 31/402
251/30.04
(Continued)

FOREIGN PATENT DOCUMENTS

CN    1360115        7/2002
CN    1740579 A      3/2006
(Continued)

OTHER PUBLICATIONS

Bai, CN-106051208-A, Machine Translation from PE2E Search (Year: 2016).*
(Continued)

*Primary Examiner* — Daphne M Barry
(74) *Attorney, Agent, or Firm* — Volpe Koenig

(57) ABSTRACT

A sanitary valve (1) for use in a fitting (2), including a valve housing (3), a main valve (4) which has a movable diaphragm (5), and a pilot valve (6), by which the main valve (4) can be actuated. The position of the diaphragm (5) can be specified by the position of a valve tappet (7) of the pilot valve (6), and a tube securing element (9) which is paired with an inlet opening (8) of the valve housing (3) is formed on the valve housing (3) and/or a mouthpiece securing element (11) or a jet regulator securing element which is paired with an outlet opening (10) of the valve housing (3) is formed on the valve housing (3) and/or the sanitary valve (1) has a clamping device (12), by which the valve housing (3) and an adjustment device part (13) can be rigidly connected together or are rigidly connected together.

15 Claims, 3 Drawing Sheets

(58) Field of Classification Search
USPC .......................................................... 137/801
See application file for complete search history.

(56) References Cited

U.S. PATENT DOCUMENTS

| | | | |
|---|---|---|---|
| 6,000,674 A | 12/1999 | Cheng | |
| 6,382,586 B1 | 5/2002 | Wilson et al. | |
| 7,296,593 B2 * | 11/2007 | Matsui | F16K 31/128 |
| | | | 251/38 |
| 7,445,024 B2 * | 11/2008 | Paterson | E03C 1/057 |
| | | | 137/606 |
| 7,735,667 B2 | 6/2010 | Schutz | |
| 2009/0146090 A1 * | 6/2009 | Hashimoto | F16K 31/52491 |
| | | | 251/25 |
| 2014/0174556 A1 * | 6/2014 | Herbert | E03C 1/057 |
| | | | 137/560 |
| 2017/0343127 A1 | 11/2017 | Bian et al. | |

FOREIGN PATENT DOCUMENTS

| | | | | |
|---|---|---|---|---|
| CN | 1924415 A | | 3/2007 | |
| CN | 200972002 Y | | 11/2007 | |
| CN | 101218458 | | 7/2008 | |
| CN | 201237001 Y | | 5/2009 | |
| CN | 201475339 | | 5/2010 | |
| CN | 201779309 U | | 3/2011 | |
| CN | 203656296 | | 6/2014 | |
| CN | 104089050 A | | 10/2014 | |
| CN | 106051208 A | * | 10/2016 | ........... F16K 47/023 |
| CN | 206130278 | | 4/2017 | |
| DE | 3120210 | | 12/1982 | |
| DE | 102012221047 | | 5/2014 | |
| DE | 102015114062 A1 | * | 3/2017 | ............... E03D 3/06 |
| DE | 202016001106 | | 6/2017 | |
| GB | 2103391 | | 2/1983 | |
| JP | 2002048253 | | 2/2002 | |
| JP | 200271050 | | 3/2002 | |
| JP | 200622638 | | 1/2006 | |
| WO | 2014076242 A1 | | 5/2014 | |

OTHER PUBLICATIONS

Schmidtz, DE_102015114062, Machine Translation from PE2E Search (Year: 2015).*
Chinese Office Action dated Jun. 29, 2021 in a parallel Chinese Application with an English Translation.

* cited by examiner

SANITARY VALVE WITH A DIAPHRAGM

BACKGROUND

The invention relates to a sanitary valve for insertion into a fitting, comprising a valve housing, a main valve which has a movable diaphragm, and a pilot valve by which the main valve is actuatable, wherein a position of the diaphragm is predefinable by a setting of a valve tappet of the pilot valve.

Sanitary valves of this kind are already known. They are inserted, for example, into fittings in order to be able to switch on or switch over a stream of water inside the fitting with the lowest possible actuation force and/or with the smoothest possible switching behavior.

The stream of liquid through the valve often comes into contact with the fitting itself. This can be disadvantageous if the fitting is made of a water-sensitive material, for example wood, or of materials that are partially harmful to health. Through the contact with water, the fitting may suffer damage and/or cause undesired contamination of the water.

A further disadvantage of previously known sanitary valves of the type described at the outset is that attachment of a tube to sanitary valves of this kind has to be effected via additional adapter parts, which for this purpose have to be connected to the valve housing. A further disadvantage of previously known sanitary valves is that a mouthpiece or a jet regulator cannot be placed on an outflow opening located downstream from the main valve of such sanitary valves, due to their mode of construction and their intended arrangement inside the fitting. Here, further intermediate pieces are in most cases needed, for example tubes, which permit a connection of the sanitary valve to a mouthpiece or to a jet regulator.

DE 10 2012 221 047 A1 relates to a valve upper part for insertion into a receiving opening of a sanitary fitting, with a housing, with a water duct leading from an inlet into the housing to an outlet from the housing by way of a valve seat, with a diaphragm element which, together with the valve seat, forms a diaphragm valve having a control opening and a compensating opening, and with a drive for the continuous movement of a control piston for the control opening.

DE 20 2016 001 106 U1 and CN 206 130 278 U relate to a valve-actuating device with a manual operating element and with a valve that is actuatable via the manual operating element, wherein a control element is in operative connection with the manual operating element, wherein the valve is actuatable with a distal end of the control element, and a compensating device is arranged in the operative connection between the control element and the manual operating element, which compensating device has a tappet guided movably into a recess and permits a relative movement of the manual operating element toward the control element, and wherein a restoring element is present which counters the relative movement with a restoring force, wherein the restoring element is arranged outside the compensating device.

SUMMARY

The object of the invention is therefore to make available a sanitary valve with improved use properties, preferably by which it is possible to save on additional attachment parts for attaching a tube and/or a mouthpiece and/or a jet regulator.

This object is achieved by one or more features of the invention. In particular, in a sanitary valve of the type mentioned at the outset, the object is thus achieved according to the invention by the fact that a tube securing means assigned to an inflow opening of the valve housing is formed on the valve housing. By virtue of the tube securing means being formed on the valve housing itself, a tube can be connected directly to the valve housing. For this purpose, there is no need for any additional attachment parts interposed between the tube and the valve housing. It is simply necessary that the tube has a suitable attachment element by which it is securable or secured on the tube securing means. In this way, the sanitary valve can be assembled particularly easily by the tube being guided through a through-opening of a fitting and being connectable or connected to the valve housing outside of a valve-receiving space of the fitting. After the tube has been secured on the valve housing, the sanitary valve together with the tube is easily insertable into the valve-receiving space. Further attachment parts are not required for this purpose, which permits a particularly cost-effective solution to attaching the tube to the sanitary valve.

According to a further solution for achieving the object, which can be provided as an alternative or addition to the aforementioned features, it is provided according to the invention that a mouthpiece securing means and/or a jet regulator securing means assigned to an outflow opening of the valve housing is formed on the valve housing. By virtue of a mouthpiece securing means and/or a jet regulator securing means being formed directly on the valve housing, the mouthpiece and/or the jet regulator is securable on the valve housing directly, i.e. without additional attachment parts. It is simply necessary that a securable mouthpiece and/or a securable jet regulator have/has a suitable attachment element by which it is/they are securable on the mouthpiece securing means and/or on the jet regulator securing means. This permits particularly simple assembly and/or fastening of the sanitary valve in a fitting without the need for additional fixing components.

According to an additional solution for achieving the object, which can be provided as an alternative or addition to the aforementioned features, it is provided according to the invention that the sanitary valve has a clamping device, by which the valve housing and an adjustment device part are firmly connectable or connected to each other. The adjustment device part comprises the pilot valve, by which the diaphragm of the main valve is actuatable. To be able to protect the mechanism of the adjustment device part during the installation of the sanitary valve into a fitting, it is advantageous if the adjustment device part and the valve housing are not designed as one piece but in particular as two pieces. It is thus possible first of all for a tube to be secured on the tube securing means of the valve housing without the adjustment device part being connected to the valve housing. After the tube has been secured to the valve housing, coupling of the valve housing to the adjustment device part is possible by the clamping device. The clamping device is preferably configured such that releasable coupling is possible, which is expedient, for example, in order to allow easier maintenance or cleaning of the sanitary valve, in particular in order to allow defective valve housings or adjustment device parts to be exchanged separately from each other.

In order to permit easy removal of the sanitary valve from a fitting, in particular without release of the tube, but at the same time to prevent the sanitary valve from being pushed too far in the insertion direction into a valve-receiving space, it may be particularly expedient if the tube securing means has a maximum external diameter which is smaller than a maximum external diameter of a bearing element which is formed or mounted on the valve housing and with which the valve housing bears on a wall of the fitting, wherein the wall has a through-opening with a clear internal diameter which is greater than the maximum external diameter of the tube securing means. Fittings have a valve-receiving space into which a sanitary valve is insertable. A tube for carrying water extends through the fitting to an inflow opening of the sanitary valve. To ensure that the sanitary valve cannot be inserted too far in the insertion direction into the valve-receiving space, the sanitary valve has a bearing element, and the fitting has the wall which forms a stop for the bearing element. The stop defines a maximum insertion depth into the fitting, at which depth the bearing element abuts the wall. The through-opening of the wall is configured to allow the tube to be guided into the valve-receiving space. By virtue of the maximum external diameter of the tube securing means being smaller than the maximum external diameter of the bearing element, the whole sanitary valve together with the tube secured to the tube securing means can be removed from the valve-receiving space, wherein the tube can be pulled out via the through-opening, such that the sanitary valve together with the tube secured thereon is removable completely from the fitting. Thus, assembly and also maintenance are possible without releasing the tube from the valve housing. A further advantage of this configuration is that the tube securing means and the tube secured thereon are completely insertable into the through-opening, i.e. are then arranged upstream from the wall of the fitting, as a result of which less space is needed for the components of the sanitary valve that are arranged downstream from the wall in the assembly position.

A stable and therefore particularly advantageous securing of the tube on the valve housing can be achieved by the fact that the tube securing means has an outer thread for attachment of a corresponding inner thread. It may be particularly expedient here if the sanitary valve has a securing sleeve with an inner thread corresponding to the outer thread, wherein the securing sleeve is connectable or connected to a tube. This embodiment is characterized by simpler production. Alternatively to this, provision can likewise be made that the tube securing means has an inner thread for attachment of a corresponding outer thread. It may be particularly expedient here if the sanitary valve has a securing sleeve with an outer thread corresponding to the inner thread, wherein the securing sleeve is connectable or connected to a tube. Compared to the first alternative, this one involves more complex production. A further possibility can be that the tube securing means is configured as a securing plate with a tube receptacle.

To be able to keep the number of individual components of the sanitary valve as small as possible, it may be advantageous if the sanitary valve has a mouthpiece which is securable or secured directly on the mouthpiece securing means, wherein the sanitary valve inserted in a valve-receiving space of the fitting is fixable or fixed on the fitting by means of the mouthpiece secured on the mouthpiece securing means. In this way, unwanted removal or sliding of the sanitary valve, inserted in the valve-receiving space in the assembly position, can be prevented, since the mouthpiece secured on the mouthpiece securing means protrudes so far out of an outlet opening in an outer wall of the fitting that the sanitary valve is thus fixed in the axial direction, by the mouthpiece bearing at least with a side wall on an edge of the outlet opening.

Alternatively or in addition to this, in order to achieve such fastening of the sanitary valve, it may likewise be advantageous if the sanitary valve has a jet regulator which is securable or secured directly on the jet regulator securing means, wherein the sanitary valve inserted in a valve-receiving space of the fitting is fixable or fixed on the fitting by the jet regulator secured on the jet regulator securing means.

To achieve particularly good fixing of the sanitary valve in the assembly position, it may be expedient if the safety valve has, alternatively or in addition, a securing ring by which the valve is fixable on the fitting. It may be particularly expedient here if the securing ring is securable at an edge of an insertion opening of the fitting and, in the assembly position, ensures that the sanitary valve inserted into the fitting is fixed in the valve-receiving space. The securing ring can be configured as a snap ring, for example. In the inserted state, the snap ring can engage in a groove at the edge of the insertion opening and fasten the sanitary valve axially on the fitting. The manufacturing costs of the sanitary valve as a whole can be reduced through the use of a snap ring, which is able to be produced inexpensively, while still permitting very stable axial fastening of the sanitary valve.

To generate a smooth, splash-free water jet, it may be expedient if a or the aforementioned mouthpiece has a jet regulator, or a jet regulator is arranged between a or the aforementioned mouthpiece and a or the aforementioned outflow opening.

To be able to fix the sanitary valve in a particularly stable manner on the fitting, in an assembly position in which it is inserted into the valve-receiving space, using the securable or secured mouthpiece or the securable or secured jet regulator, it may be advantageous if a or the aforementioned mouthpiece or a or the aforementioned jet regulator has an inner thread and/or the valve housing at the outflow opening, in particular at the mouthpiece securing means or at the jet regulator securing means, has a corresponding outer thread, or if a or the mouthpiece or a or the jet regulator has an outer thread and/or the valve housing at the outflow opening, in particular at the mouthpiece securing means or at the jet regulator securing means, has a corresponding inner thread.

So that the water flowing through the sanitary valve does not come into contact with the fitting, it may be advantageous if a channel closed toward the fitting and/or a pressure chamber closed toward the fitting is formed through the valve housing and the adjustment device part, as a result of which no contact is possible between the fitting and a liquid flowing through the sanitary valve. The valve housing and the adjustment device part thus form a barrier toward the fitting. Connection sites between the valve housing and the adjustment device part can be sealed off, for example by sealing elements and/or by the movable diaphragm, against flow of water to the fitting.

To be able to achieve a particularly cost-effective and yet particularly stable connection between the valve housing and the adjustment device part in the assembly position, it may be advantageous if the clamping device is comprised of two parts, preferably of two identical parts, which each have a coupling element and a corresponding mating coupling element for receiving the coupling element of the other part, as a result of which the two parts are couplable to each other, preferably releasably. By producing only one part, which is couplable to identical other parts, it is possible to achieve particularly favorable production of the individual parts of the coupling device.

It may be particularly expedient if the clamping device has two parts which are connectable to each other, preferably releasably, and which, in the assembled position, form a hollow cylinder that encloses and thus firmly connects the valve housing and the adjustment device part at least in a coupling region, preferably wherein the clamping device permits a firm connection of the valve housing and of the adjustment device part outside the fitting. In the assembled position, the clamping device is arranged preferably concentrically around the valve housing and the adjustment device part and also holds these together outside the fitting. By virtue of the connection of the valve housing and of the adjustment device part outside the fitting, very simple assembly is possible since the two parts are first of all connectable and are then insertable in the connected state into the fitting.

In order to avoid a slipping movement or a skew position of the sanitary valve inside the valve-receiving space, it may be advantageous if the sanitary valve has at least one fixing element whose maximum external diameter is configured such that the sanitary valve, in the state when inserted into the fitting, is fixed in the radial direction, since the at least one fixing element bears on an inner wall of a or the valve-receiving space, and the sanitary valve is therefore insertable into the fitting or removable from the fitting exclusively in an axial direction. It may also be particularly advantageous if the fixing element or the fixing elements is/are formed by the clamping device and/or by the bearing element.

Provision can moreover be made that the movable diaphragm closes a or the aforementioned pressure chamber which is configured between the valve housing and a or the adjustment device part, that the pressure chamber is fillable, via a filling opening, with liquid that flows in via a valve inlet, wherein the pressure chamber is set up in such a way that a pressure builds up inside the pressure chamber when a relief opening is closed. The pressure built up inside the pressure chamber presses a valve body of the main valve into a valve seat. The main valve is then in its closed position. The relief opening is openable or closable by the pilot valve. In the closed position of the relief opening, the valve tappet acts on the relief opening and closes the latter. When the relief opening opens, the pressure inside the pressure chamber decreases, such that the diaphragm is removed from the valve seat with the valve body, and the main valve is opened.

The invention relates to a sanitary valve for insertion into a fitting, comprising a valve housing, a main valve which has a movable diaphragm, and a pilot valve by which the main valve is actuatable, wherein a position of the diaphragm is predefinable by a setting of a valve tappet of the pilot valve, wherein a tube securing means assigned to an inflow opening of the valve housing is formed on the valve housing, and/or wherein a mouthpiece securing means and/or a jet regulator securing means assigned to an outflow opening of the valve housing is formed on the valve housing, and/or wherein the sanitary valve has a clamping device by which the valve housing and an adjustment device part are firmly connectable or connected to each other.

BRIEF DESCRIPTION OF THE DRAWINGS

The invention is now described on the basis of illustrative embodiments, but it is not restricted to these illustrative embodiments. Further illustrative embodiments will emerge from combination of the features of individual or multiple claims with one another and/or with individual or multiple features of the illustrative embodiments.

In the figures.

DETAILED DESCRIPTION

Figure 1:
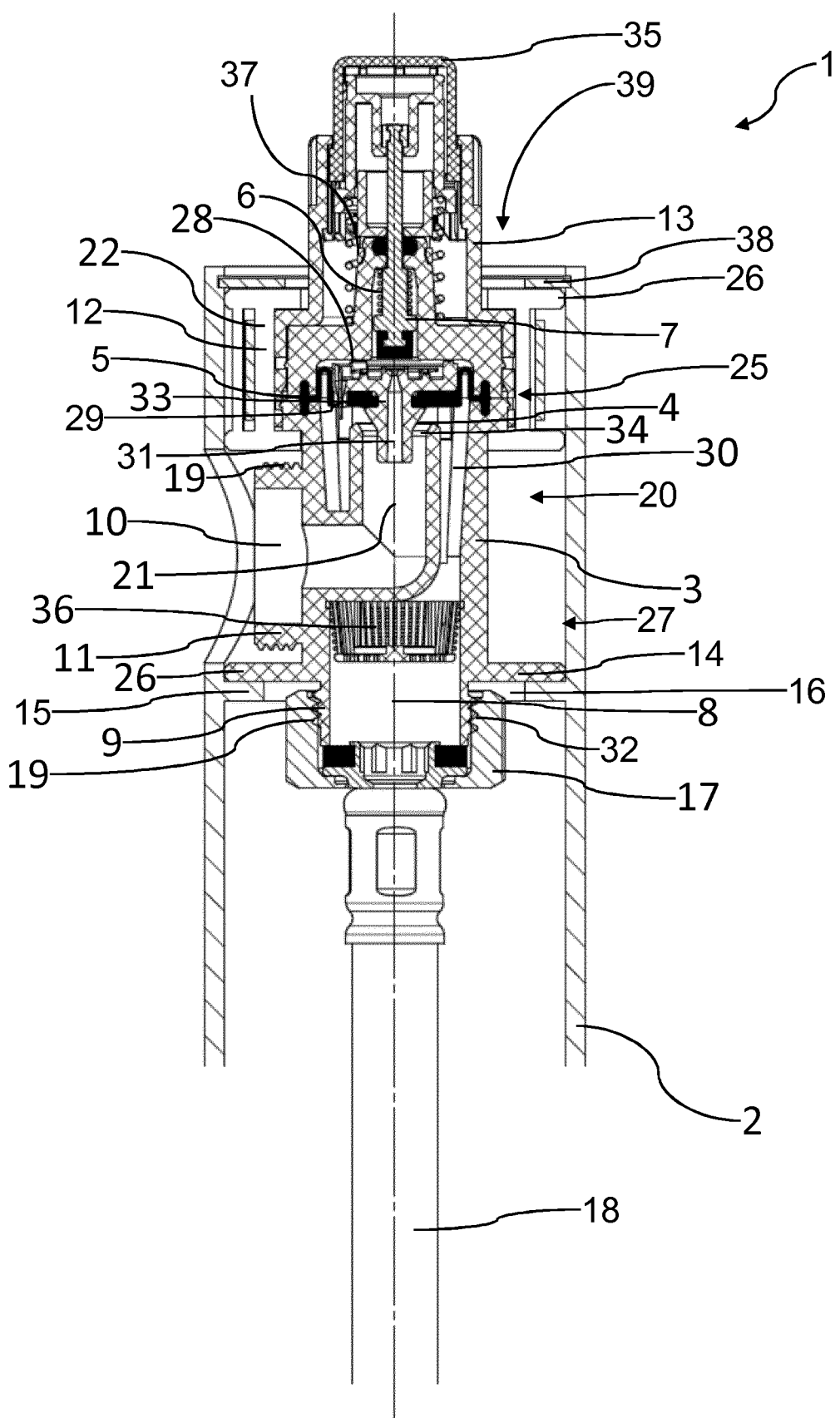
FIG. 1 shows an axial section through a sanitary valve according to the invention, when inserted in the assembled position into a fitting.

FIG. 1 shows a sanitary valve designated overall by reference sign 1 and configured to be inserted into a fitting 2. The sanitary valve 1 has a valve housing 3, a main valve 4 with a movable diaphragm 5, and a pilot valve 6. The main valve 4 is configured in a manner known per se. The movable diaphragm 5 is made from an elastic material. The main valve 4 has a valve body 33 and a valve seat 34 into which the valve body 33 is insertable. In the open position of the main valve 4, the valve body 33 lies outside the valve seat 34, such that water can flow past it. In the closed position of the main valve 4, the valve body 33 is pressed into the valve seat 34, such that no water can flow through the valve seat 34 into an outflow opening 10.

The valve body 33 has a relief opening 31 through which water can flow off into the outflow opening 10 when the relief opening 31 is opened. The relief opening 31 is closable by a valve tappet 7 of the pilot valve 6. In the closed position of the relief opening 31, a pressure builds up inside a pressure chamber 28, since water flows in from a valve inlet 30 via a filling opening 29. The pressure inside the pressure chamber 28 presses the valve body 33 of the main valve 4 into the valve seat 34 and closes a channel 21 of the sanitary valve 1. The main valve 4 is then in the closed position.

The pilot valve 6 can be operated by an adjustment device part 13. The setting of the valve tappet 7 relative to the valve body 33 can be changed by the adjustment device part 13. The setting of the valve tappet 7 is adjustable by an actuation element 35.

The adjustment device part 13 preferably has a push-push mechanism which can be operated from the outside by the actuation element 35, in particular by a knob. By repeated pressing of the actuation element 35, it is possible to switch over between different switching positions.

FIG. 1 shows a switching position in which the sanitary valve 1, in particular the main valve 4, is in the open position.

A tube securing means 9 assigned to the inflow opening 8 of the valve housing 3 is formed on the valve housing 3. In the embodiments according to FIGS. 1-3, the tube securing means 9 is configured as a nozzle with an outer thread 19.

The tube securing means 9 has a maximum external diameter which is smaller than a maximum external diameter of a bearing element 14 formed on the valve housing 3. The bearing element 14 is designed for placing the valve housing 3 onto a wall 15 of the fitting 2. Downstream in the direction of flow of the water through the sanitary valve 1, the bearing element 14 bears on the wall 15 when the valve is in the assembled state. The through-opening 16 has a clear internal diameter greater than the maximum external diameter of the tube securing means 9, such that the tube securing means 9 is insertable into the through-opening 16.

The sanitary valve 1 has a securing sleeve 17 with an inner thread 32 corresponding to the outer thread 19 of the tube securing means 9. It is thereby possible to attach the tube 18 directly to the valve housing 3 via the securing sleeve 17. The securing sleeve 17 is connected or connectable to the tube 18.

The valve housing 3 forms a mouthpiece securing means 11 at an outflow opening 10 of the valve housing 3. The mouthpiece securing means 11 is configured as a nozzle with an outer thread 19 onto which a mouthpiece is directly securable or secured. In the assembly position, i.e. when the sanitary valve 1 is inserted into a valve-receiving space 20 of the fitting 2, the sanitary valve 1 is fixed or fixable on the fitting 2 by the mouthpiece secured on the mouthpiece securing means 11. In this way, unwanted sliding or removal of the sanitary valve 1 from the fitting 2 is not possible, since the mouthpiece abuts with at least one side wall on the edge of an aperture through the fitting 2. The aperture forms an outlet opening from the fitting 2, through which the secured mouthpiece protrudes from the fitting 2. Alternatively or in addition to this, the valve housing 3 can also form or have a jet regulator securing means at the outflow opening 10 of the valve housing 3. It is thus also possible for the sanitary valve 1 to be fastened using a jet regulator mounted on the jet regulator securing means.

The mouthpiece can have a jet regulator in order to generate a water jet with desired properties. Alternatively to this, it is likewise conceivable that a jet regulator is interposed between the mouthpiece and the mouthpiece securing means 11, for example by being insertable into the mouthpiece.

The valve housing 3 and the adjustment device part 13 together form a channel 21 closed toward the outside. It is thus possible to prevent a situation where water flowing through the channel 21 comes into contact with the fitting 2. In addition, it is possible for the mouthpiece and/or the jet regulator to be attached to the valve housing 3 directly, i.e. without further adapter parts, without interposition of further connection pieces between the sanitary valve 1 and the mouthpiece and/or jet regulator. This permits a considerably more compact and more cost-effective design.

The sanitary valve 1 has a clamping device 12 with which the valve housing 3 and the adjustment device part 13 are firmly connectable or connected to each other in a coupling region 25 of the sanitary valve 1. In the assembled position of the sanitary valve 1, the valve housing 3 and the adjustment device part 13 are firmly connected to each other.

The clamping device 12 according to FIGS. 4-7 has two identical parts. Each part 22 is here configured as a half of a hollow cylinder. The two parts 22 of the clamping device 12 are at least partially arrangeable around the valve housing 3 and the adjustment device part 13, as a result of which they are firmly couplable to each other. The two parts 22 each have a coupling element 23 and a corresponding mating coupling element 24 for receiving the coupling element 23 of the respective other part 22. In the assembled position, the coupling element 23 of one part 22 engages in the mating coupling element 24 of the other part 2. In this way, the two parts are couplable to each other, preferably releasably.

The coupling element 23 and the mating coupling element 24 of the parts 22 of the clamping device 12 according to FIGS. 4-7 together form a latch connection, wherein the coupling element 23 is insertable into an opening formed on the mating coupling element 24 and can be latched in said opening.

By use of the clamping device 12, it is possible for the valve housing 3 and the adjustment device part 13 to be already firmly connected to each other outside the fitting 2, which permits simple assembly of the sanitary valve 1. The sanitary valve 1, with the tube 18 secured on the valve housing 3 and with the adjustment device part 13 coupled to the valve housing 3, can then be inserted into the valve-receiving space 20 in the fitting 2.

To protect the adjustment device part 13, which can have a relatively sensitive mechanism, from damage caused by jolts during the securing of the tube 18 to the valve housing 3, it is possible to couple the valve housing 3 to the adjustment device part 13 after the tube has been secured on the tube securing means 9. This is possible by virtue of the modular configuration of the sanitary valve 1, wherein the operating mechanism of the adjustment device part 13 is easily couplable to the valve housing 3 after the tube 18 has been mounted on the valve housing 3 by the clamping device 12.

To be able to prevent the sanitary valve 1 from slipping in the radial direction in the assembly position of the sanitary valve 1, the sanitary valve 1 has several fixing elements 26. The maximum external diameter of the fixing elements 26, which are of circular cross section, is dimensioned such that the sanitary valve 1, in the state when inserted into the fitting 2, is fixed in the radial direction, by the fixing elements 26 bearing on an inner wall 27 of the valve-receiving space 20. In this way, the sanitary valve 1 is insertable into the fitting 2 or removable from the fitting 2 exclusively in an axial direction into an insertion opening 39.

Figures 2, 3:
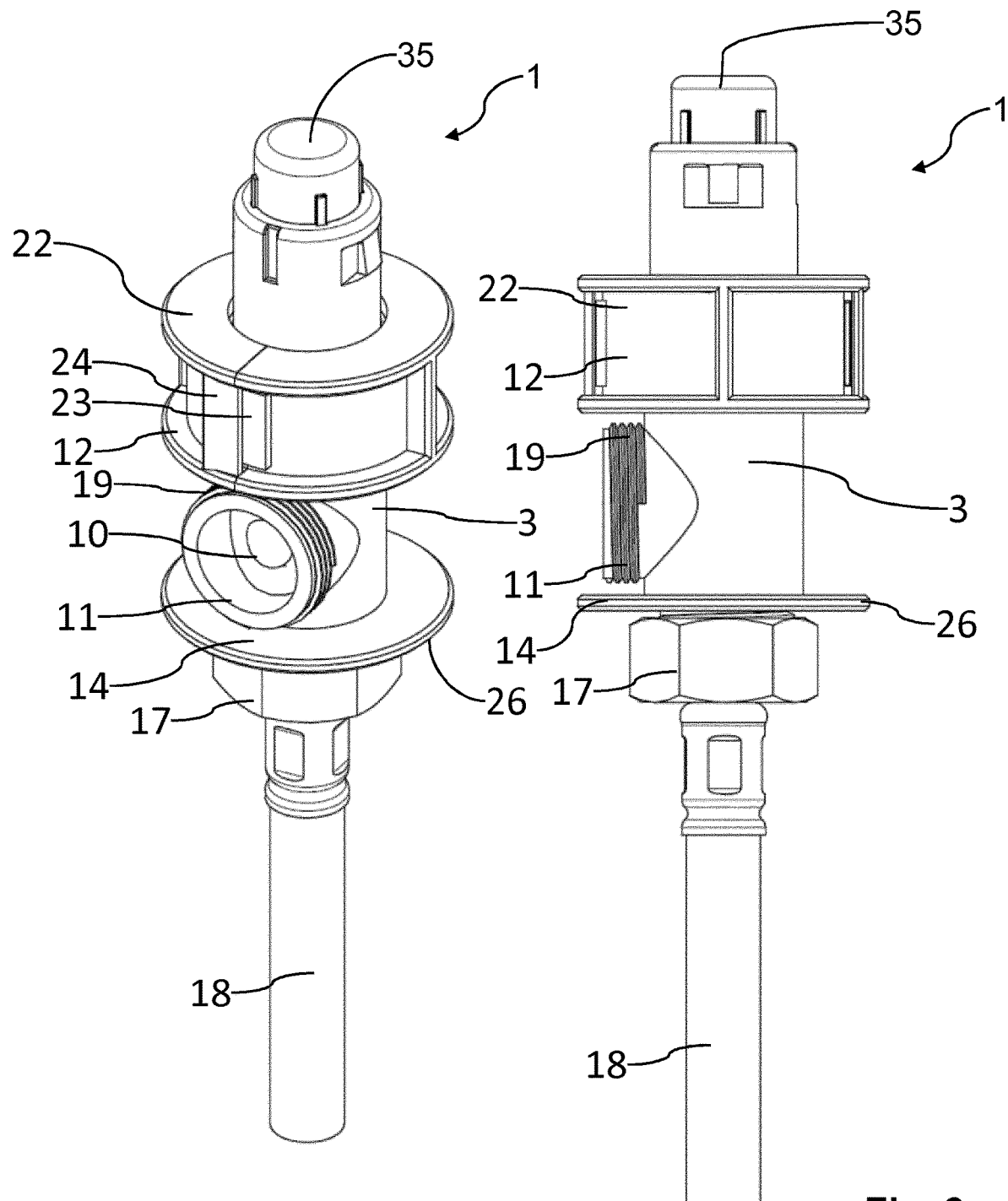
FIG. 2 shows a three-dimensional oblique view of the sanitary valve according to FIG. 1.
FIG. 3 shows a three-dimensional side view of the sanitary valve according to FIG. 1.
Figure 4:
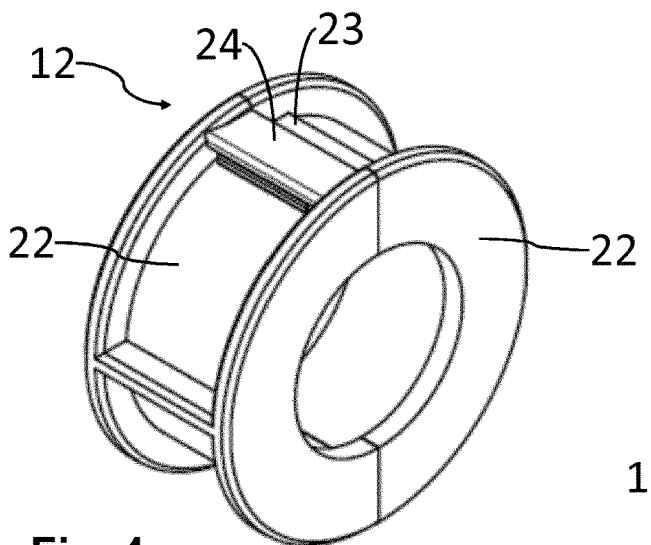
FIG. 4 shows a three-dimensional oblique view of a clamping device of the sanitary valve.
Figure 5:
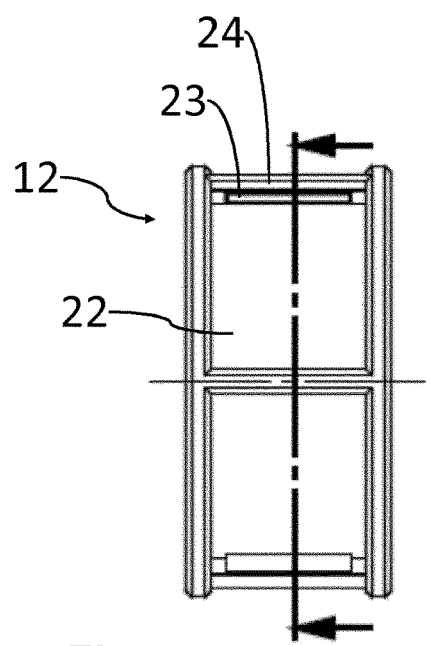
FIG. 5 shows a three-dimensional side view of the clamping device.
Figure 6:
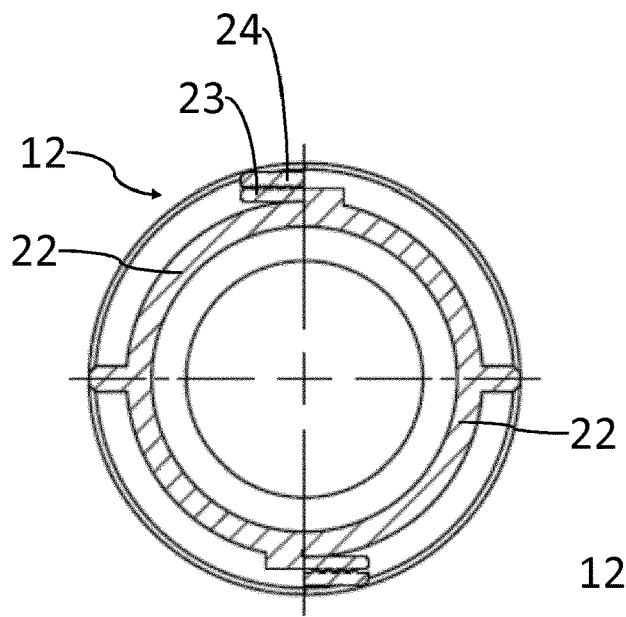
FIG. 6 shows a transverse section of the clamping device according to FIG. 4.
Figure 7:
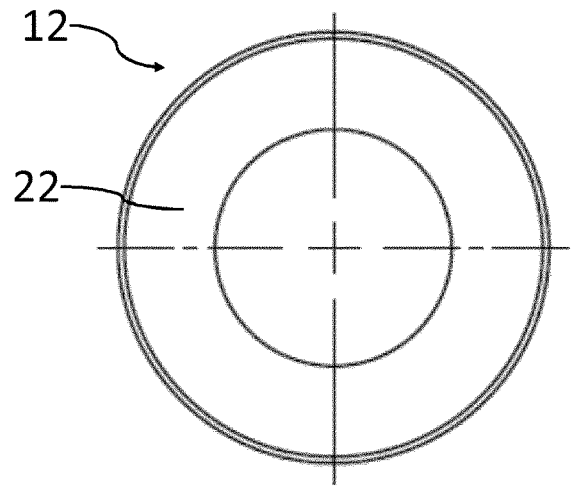
FIG. 7 shows a plan view of the assembled parts of the clamping device.

In the sanitary valve 1 shown in FIGS. 1-3, the fixing elements 26 are formed by the clamping device 12 and by the bearing element 14.

A filter element 36 is arranged between inflow opening 8 and valve inlet 30, as a result of which particles flowing in from the tube 18 can be prevented from reaching the main valve 4.

To ensure that the sanitary valve 1 inserted into the valve-receiving space 20 in the assembly position can be particularly well fixed, the sanitary valve 1 has a securing ring 38 by which the valve is fixable on the fitting 2. As is shown in FIG. 1, the securing ring 38 is securable at the edge of the insertion opening 39 of the valve-receiving space 20. By use of the securing ring 38, it is possible to prevent axial sliding or removal of the sanitary valve 1 from the insertion opening 39. The securing ring 38 is preferably designed as a snap ring which, in the inserted state, engages in a recess, designed particularly as a groove, on the fitting 2 and thereby axially fastens the sanitary valve 1. A snap ring permits particularly cost-effective but stable axial fastening.

LIST OF REFERENCE SIGNS 1 sanitary valve
2 fitting
3 valve housing
4 main valve
5 movable diaphragm
6 pilot valve
7 valve tappet
8 inflow opening
9 tube securing means
10 outflow opening
11 mouthpiece securing means
12 clamping device
13 adjustment device part
14 bearing element
15 wall of the fitting
16 through-opening
17 securing sleeve
18 tube
19 outer thread
20 valve-receiving space
21 channel
22 part of the clamping device 23 coupling element
24 mating coupling element
25 coupling region
26 fixing element
27 inner wall of the valve-receiving space
28 pressure chamber
29 filling opening
30 valve inlet
31 relief opening
32 inner thread
33 valve body
34 valve seat
35 actuation element
36 filter element
37 push-push mechanism
38 securing ring
39 insertion opening

The invention claimed is:

1. A sanitary valve (1) for insertion into a fitting (2), the sanitary valve comprising:
a valve housing (3), insertable into a fitting (2),
a main valve (4) which has a movable diaphragm (5),
a pilot valve (6) by which the main valve (4) is actuatable, and
a valve tappet (7) by which a position of the diaphragm (5) is predefinable by a setting of the valve tappet (7) of the pilot valve (6),
an adjustment device part (13) and a clamping device (12) by which the valve housing (3) and the adjustment device part (13) are connected to each other;
wherein the main valve (4), the pilot valve (6) and valve tappet (7) are entirely housed within the valve housing (3), which comprises a portion configured as a tube securing means (9), to which a tube (8) is directly attachable and which is assigned to an inflow opening (8) of the valve housing (3) and wherein the clamping device (12) is comprised of two parts (22) which each include a coupling element (23) and a corresponding mating coupling element (24) for receiving the coupling element (23) of the other part (22), as a result of which the two parts (22) are couplable to each other.

2. The sanitary valve (1) as claimed in claim 1, further comprising at least one of a mouthpiece securing means (11) or a jet regulator securing means assigned to an outflow opening (10) of the valve housing (3) formed on the valve housing (3).

3. The sanitary valve (1) as claimed in claim 2, further comprising a mouthpiece secured directly on the mouthpiece securing means (11), wherein the sanitary valve (1) is adapted to be inserted in a valve-receiving space (20) of the fitting (2) and is adapted to be fixed on the fitting (2) by the mouthpiece secured on the mouthpiece securing means (11), or the sanitary valve (1) has a securing ring (38) by which the valve is adapted to be on the fitting (2).

4. The sanitary valve (1) as claimed in claim 2, further comprising a jet regulator secured directly on the jet regulator securing means, and the sanitary valve (1) is adapted to be inserted in a valve-receiving space (20) of the fitting (2) and is adapted to be fixed on the fitting (2) by the jet regulator secured on the jet regulator securing means, or a mouthpiece that is secured directly on the mouthpiece securing means (11) has a jet regulator, or a jet regulator is arranged between the mouthpiece and the outflow opening (10).

5. The sanitary valve (1) as claimed in claim 4, wherein the mouthpiece has an inner thread and the valve housing (3) at the outflow opening (10) has a corresponding outer thread (19), or the mouthpiece has an outer thread (19) and the valve housing (3) at the outflow opening (10) has a corresponding inner thread (32), or the jet regulator has an inner thread and the valve housing (3) at the outflow opening (10) has a corresponding outer thread (19), or the jet regulator has an outer thread (19) and the valve housing (3) at the outflow opening has a corresponding inner thread (32).

6. The sanitary valve (1) as claimed in claim 1, further comprising at least one of a channel (21) configured to be closed toward the fitting (2) or a pressure chamber (28) configured to be closed toward the fitting (2) formed through the valve housing (3) and the adjustment device part (13), such that there is adapted to be no contact between the fitting (2) and a liquid flowing through the sanitary valve (1).

7. The sanitary valve (1) as claimed in claim 1, wherein the clamping device (12) has two parts (22) which are connectable to each other and which, in an assembled position, form a hollow cylinder that encloses and firmly connects the valve housing (3) and the adjustment device part (13) at least in a coupling region (25).

8. The sanitary valve (1) as claimed in claim 7, wherein the clamping device (12) permits a firm connection of the valve housing (3) and of the adjustment device part (13) outside the fitting (2).

9. The sanitary valve (1) as claimed in claim 1, further comprising at least one fixing element (26) having a maximum external diameter that is configured such that the sanitary valve (1), in a state when inserted into the fitting (2), is fixed in a radial direction, with the at least one fixing element (26) being configured to bear on an inner wall (27) of a valve-receiving space (20), such that the sanitary valve (1) is adapted to be inserted into the fitting (2) or is adapted to be removable from the fitting (2) exclusively in an axial direction.

10. The sanitary valve (1) as claimed in claim 9, wherein the at least one fixing element (26) is formed by at least one of the clamping device (12) by which the valve housing (3) and an adjustment device part (13) are connected to each other or by a bearing element (14) formed or mounted on the valve housing (3) and with which the valve housing (3) adapted to bear on a through-opening (16) in a wall (15) of the fitting (2).

11. The sanitary valve (1) as claimed in claim 1, wherein the movable diaphragm (5) closes a pressure chamber (28) which is configured between the valve housing (3) and an adjustment device part (13), the pressure chamber (28) is adapted to be filled via a filling opening (29), with liquid that flows in via a valve inlet (30), and the pressure chamber (28) is configured such that a pressure builds up inside the pressure chamber (28) when a relief opening is closed.

12. A method of assembling the sanitary valve (1) as claimed in claim 1 into the fitting (2) such that a direct contact between the fitting (2) and a stream of liquid is prevented, the method comprising connecting a tube (18) directly to the valve housing (3) by connecting an attachment element of the tube (18) to the tube securing means (9).

13. The method as claimed in claim 12, further comprising connecting the tube (18) to the valve housing (3) before the sanitary valve (1) is inserted into a valve-receiving space of a fitting (2).

14. A sanitary valve (1) for insertion into a fitting (2), the sanitary valve comprising:
a valve housing (3), insertable into a fitting (2),
a main valve (4) which has a movable diaphragm (5),
a pilot valve (6) by which the main valve (4) is actuatable, and
a valve tappet (7) by which a position of the diaphragm (5) is predefinable by a setting of the valve tappet (7) of the pilot valve (6),
wherein the main valve (4), the pilot valve (6) and valve tappet (7) are entirely housed within the valve housing (3), which comprises a portion configured as a tube securing means (9), to which a tube (8) is directly attachable and which is assigned to an inflow opening (8) of the valve housing (3), wherein the tube securing means (9) has a maximum external diameter which is smaller than a maximum external diameter of a bearing element (14) formed or mounted on the valve housing (3) and with which the valve housing (3) adapted to bear on a through-opening (16) in a wall (15) of the fitting (2), and the maximum external diameter of the tube securing means (9) is configured to be smaller than a clear internal diameter of the through-opening (16).

15. A sanitary valve (1) for insertion into a fitting (2), the sanitary valve comprising:
  a valve housing (3), insertable into a fitting (2),
  a main valve (4) which has a movable diaphragm (5),
  a pilot valve (6) by which the main valve (4) is actuatable, and
  a valve tappet (7) by which a position of the diaphragm (5) is predefinable by a setting of the valve tappet (7) of the pilot valve (6),
wherein the main valve (4), the pilot valve (6) and valve tappet (7) are entirely housed within the valve housing (3), which comprises a portion configured as a tube securing means (9), to which a tube (8) is directly attachable and which is assigned to an inflow opening (8) of the valve housing (3), wherein the tube securing means (9) has an outer thread (19) for attachment of a corresponding inner thread (32) of a securing sleeve (17) of the sanitary valve (1) that is adapted to be connected to a tube (18), or the tube securing means (9) has an inner thread for attachment of a corresponding outer thread (19) of a securing sleeve (17) of the sanitary valve (1) that is adapted to be connected to a tube (18), or the tube securing means (9) is configured as a securing plate with a tube receptacle.

* * * * *